(12) United States Patent
Mehnert

(10) Patent No.: US 12,737,620 B2
(45) Date of Patent: Sep. 15, 2026

(54) REGULARISED TRAINING OF NEURAL NETWORKS

(71) Applicant: Robert Bosch GmbH, Stuttgart (DE)

(72) Inventor: Jens Eric Markus Mehnert, Malmsheim (DE)

(73) Assignee: Robert Bosch GmbH, Stuttgart (DE)

(*) Notice: Subject to any disclaimer, the term of this patent is extended or adjusted under 35 U.S.C. 154(b) by 880 days.

(21) Appl. No.: 18/008,015

(22) PCT Filed: Jun. 2, 2021

(86) PCT No.: PCT/EP2021/064830

§ 371 (c)(1),
(2) Date: Dec. 2, 2022

(87) PCT Pub. No.: WO2021/245153

PCT Pub. Date: Dec. 9, 2021

(65) Prior Publication Data

US 2023/0237323 A1 Jul. 27, 2023

(30) Foreign Application Priority Data

Jun. 4, 2020 (DE) ..................... 10 2020 207 004.0

(51) Int. Cl.
*G06N 3/08* (2023.01)

(52) U.S. Cl.
CPC ..................................... *G06N 3/08* (2013.01)

(58) Field of Classification Search
CPC .......... G06N 3/08; G06N 3/084; G06N 3/045; G06N 99/005

(Continued)

(56) References Cited

U.S. PATENT DOCUMENTS 5,052,043 A * 9/1991 Gaborski ............... G06N 3/084 706/20
11,101,810 B1 * 8/2021 Veldhoven .......... H03M 1/1009
(Continued)

FOREIGN PATENT DOCUMENTS

CN 110188775 A 8/2019
CN 110554602 A 12/2019

OTHER PUBLICATIONS

International Search Report corresponding to PCT Application No. PCT/EP2021/064830, mailed Sep. 1, 2021 (German and English language document) (5 pages).

(Continued)

*Primary Examiner* — Cesar B Paula
(74) *Attorney, Agent, or Firm* — Maginot, Moore & Beck LLP

(57) ABSTRACT

Training an artificial neural network, ANN, which translates one or more input variables into one or more output variables, using learning data sets including learning input variable values having measurement data, and associated learning output variable values, by: mapping learning input variable values from a learning data set onto output variable values using the ANN; processing deviations of the output variable values from the respective learning output variable values using a cost function to form a measure of the error of the ANN when processing the learning input variable values; determining from the error, by backpropagation, changes in parameters, the execution of which, when learning input variable values are further processed by the ANN, improve the evaluation of the obtained output variable values by the cost function, and applying said changes to the ANN; wherein a subset of the output variable values is excluded from consideration in the backpropagation.

16 Claims, 3 Drawing Sheets

(58) Field of Classification Search
USPC ........................................................ 706/15
See application file for complete search history.

(56) References Cited

U.S. PATENT DOCUMENTS

| | | | | |
|---|---|---|---|---|
| 2017/0091619 | A1* | 3/2017 | Towal | G06V 10/82 |
| 2017/0300811 | A1* | 10/2017 | Merhav | G06N 3/084 |
| 2018/0120843 | A1* | 5/2018 | Berntorp | G06V 20/56 |
| 2018/0225562 | A1 | 8/2018 | van der Made | |
| 2019/0027251 | A1* | 1/2019 | Pulitzer | G16H 30/40 |
| 2019/0130267 | A1* | 5/2019 | Norouzi | G06N 3/044 |
| 2019/0188572 | A1* | 6/2019 | Lanctot | G06N 3/084 |
| 2020/0111006 | A1* | 4/2020 | Brenner | G06N 3/084 |
| 2020/0193279 | A1* | 6/2020 | Hostetler | G06F 1/3287 |
| 2020/0210828 | A1* | 7/2020 | Nagao | G06T 7/10 |

OTHER PUBLICATIONS

Srivastava et al., "Dropout: a Simple Way to Prevent Neural Networks from Overfitting," Journal of Machine Learning Research, vol. 15, No. 1, Jun. 2014 (Jun. 1, 2014), pp. 1929-1958, XP055193568.

Sun et al., "meProp: Sparsified Back Propagation for Accelerated Deep Learning with Reduced Overfitting," Proceedings of he 34th International Conference on Machine Learning, Jun. 19, 2017 (Jun. 19, 2017), pp. 1-10, XP055831224.

Wei et al., "Minimal Effort Back Propagation for Convolutional Neural Networks," arxiv.org, Cornell University Library, 201 Olin Library Cornell University, Sep. 18, 2017 (Sep. 18, 2017), XP080816901.

* cited by examiner

REGULARISED TRAINING OF NEURAL NETWORKS

This application is a 35 U.S.C. § 371 National Stage Application of PCT/EP2021/064830, filed on Jun. 2, 2021, which claims the benefit of priority to Serial No. DE 10 2020 207 004.0, filed on Jun. 4, 2020 in Germany, the disclosures of which are incorporated herein by reference in their entirety.

The present disclosure relates to the training of neural networks that can be used, for example, for classification or semantic segmentation of measurement data.

BACKGROUND

As a rule, the driving of a vehicle in road traffic by a human driver is trained, in that within the scope of his/her training, a student driver is confronted again and again with a certain set of situations. In each instance, the student driver must react to these situations, and through commentary or even intervention by the driving instructor, he/she receives feedback as to whether his/her reaction was correct or incorrect. This training, using a finite number of situations, is supposed to enable the student driver to also master unknown situations while driving the vehicle independently.

In order to allow vehicles to participate in road traffic in a fully or partially automated manner, attempts are made to control said vehicles using neural networks that can be trained in a highly similar manner. These networks receive, for example, sensor data from the surroundings of the vehicle as input variables and supply control signals, which are used to intervene in the operation of the vehicle, and/or precursor products, from which such control signals are formed, as output variables. For example, such a precursor product can be a classification of objects in the surroundings of the vehicle and/or a semantic segmentation of the vehicle surroundings.

SUMMARY

In the scope of the disclosure, a method for training an artificial neural network, ANN, has been developed. The ANN translates one or more input variables into one or more output variables.

The input variables can, for example, be image data, such as camera images, video images, radar images, LIDAR images or ultrasound images. The output variables can comprise, for example, an assignment to one or more classes of a predetermined classification. These classes can represent different objects, for example, Training is based on learning data sets that include learning input variable values and associated learning output variable values. At least the learning input variable values comprise measurement data that are obtained using a physical measuring operation, and/or using a partial or complete simulation of such a measuring operation, and/or using a partial or complete simulation of a technical system capable of being monitored by such a measuring operation.

In this case, the term "learning data set" does not refer to the entirety of all available learning data, but rather to a combination of one or more learning input variable values and learning output variable values assigned to precisely these learning input variable values as "labels." In the case of a trainable module used for classification and/or regression, a learning data set can comprise, for example, an image as a matrix of learning input variable values in combination with the softmax scores that the trainable module should ideally generate therefrom as a vector of learning output variable values.

During training, learning input variable values from at least one learning set are mapped onto output variable values by the ANN. Deviations of the output variable values from the respective learning output variable values are processed in accordance with a cost function ("loss function") to form a measure of the error of the ANN during processing of the learning input variable values.

The behavior of the ANN is characterized by parameters. In particular, these parameters can comprise, for example, weights with which inputs that are fed to a neuron and/or another processing unit of the ANN are summed in order to activate the neuron or said processing unit. From the error determined on the basis of the cost function, changes in the parameters, the execution of which, when learning input variable values are further processed by the ANN, is likely to improve the evaluation of the thus obtained output variable values by the cost function, are determined by backpropagation by the ANN. These changes are applied to the ANN.

The backpropagation can in particular include, for example, changing the parameters on the basis of their influence on the error. For this purpose, for example, partial derivations of the error according to these parameters can in particular be determined.

A subset of the output variable values is excluded at least from consideration in the backpropagation. This means that deviations of these output variable values from the associated learning output variable values are not used as a reason for changes to the parameters.

It has been recognized that training the ANN in this manner is significantly more robust against overfitting to the learning data sets. In particular, the tendency of the ANN to "get stuck" on certain details that are included in most learning data sets but may not be included in unseen real-world data in later applications is suppressed.

Thus, for example, training an ANN that recognizes vehicles frequently converges on the fact that wheels, mirrors or other projecting parts are more crucial for recognition than the overall silhouette of the vehicle. If, in later applications, a vehicle is equipped with wheels or mirrors that look significantly different, said vehicle may not be recognized as well or not be recognized at all.

The recognition can also fail, for example, if the vehicle is recorded from a perspective in which wheels or mirrors are difficult to recognize.

Furthermore, when training an ANN that uses images recorded during test runs, there is still an error source to the effect that the image recording is also influenced by conditions of the vehicle carrying the camera. For example, due to the large opening angle of modern cameras, a pillar or part of the engine hood of the host vehicle can come into the field of view of the camera and be contained in some or all images used for training. During training, these features can be erroneously associated with objects in the surroundings of the host vehicle that are to be recognized. If the camera is carried by another vehicle in later applications such that no parts of said vehicle come into the field of view, this can unexpectedly impair the recognition of objects in the surroundings.

Environmental conditions in learning images can also give rise to overfitting. If, for example, the road surface is always visible in each of the learning images, the recognition of the course of the road can focus inter alia on the road surface. If snow suddenly falls in later applications and obscures the road surface with a closed layer of snow, the ANN only reliably recognizes the course of the road if it has learned other features.

This is precisely what is enforced by excluding a subset of the output variable values from consideration in the backpropagation. The non-backpropagated portion of the error introduces uncertainty into the training in a targeted manner. This uncertainty results in the ANN learning, for example, to draw on more features of objects to be recognized.

The incomplete backpropagation furthermore leads to the fact that the associated computing operations are saved and training takes place faster overall.

If it is already known when collecting the learning data sets that certain output variable values are not used for backpropagation, no learning output variable values (labels) need to be procured for this purpose. Thus, if the ANN is trained, for example, to recognize objects in images or to semantically segment images, only those regions of the learning images that also contribute to backpropagation during training have to be manually labeled.

Accordingly, the time expenditure for labeling decreases.

In a particularly advantageous embodiment, for at least one learning data set, a portion of at least 40% and at most 60%, preferably of at least 45% and at most 55% and very particularly preferably of 50%, of the output variable values generated from the learning input variable values of said learning data set is excluded from consideration in the backpropagation. This has proven to be optimal in tests performed by the inventors.

The specific output variable values that are excluded from consideration in the backpropagation can be defined in advance according to any scheme. As will be explained later, however, the output variable values to be excluded can also be dynamically defined only at runtime, for example, in order to focus the training of the ANN on contents with which it still particularly "struggles." However, the output variable values to be excluded can also be drawn randomly from a distribution, for example, that on average results in a predetermined omission rate.

As explained above, ANNs can be used in particular for processing images of the same type. The input variables can thus, in particular, be pixel values that are assigned to the pixels of an image arranged in a two-dimensional grid. The output variables can then in particular assign a semantic significance to the pixels, for example. Said semantic significance can indicate, for example, to what object type the corresponding pixel belongs.

If the input variables are pixel values of an image, output values obtained by processing at least one learning data set that are excluded from consideration in the backpropagation can advantageously correspond to square blocks in the grid of pixels. For example, if 50% of the pixels are to be excluded from the backpropagation, square blocks that are considered in the backpropagation can alternate with the square blocks of the same size that are not considered in the backpropagation in both coordinate directions of the two-dimensional image in the manner of a checkerboard pattern. The square blocks can, in particular, have an edge length of between 16 and 256 pixels, for example.

In a further particularly advantageous embodiment, the output variables are probabilities and/or confidences with which an ANN used as classifier assigns the input variables to one or more classes of a predetermined classification. As explained above, the classes can then represent, in particular, objects whose presence is indicated by the measurement data used as input variables. For example, assignments to certain classes can then be excluded from consideration in the backpropagation, in that, in a vectorial classification result, those components which represent these assignments are suppressed in a targeted manner.

Assignments to certain classes can also be suppressed in a targeted manner in semantic segmentations of images.

In a particularly advantageous embodiment, the frequency distribution of the output variable values that are excluded from consideration in the backpropagation over the learning output variable values that these output variable values in each case aim for corresponds to the frequency distribution of the different learning output variable values in the learning data sets used. This makes it easier to use learning data sets that have been labeled with learning output variable values from different selections of possible labels together during training.

For example, when collecting and labeling learning images containing vehicles, each vehicle may in the past have received a label from the selection of "passenger car," "truck" or "delivery vehicle" because these vehicle types were predominantly used in public road traffic. After the appearance of the new vehicle class "SUV," new learning images were henceforth provided with a label from the selection of "passenger car," "truck," "delivery vehicle" or "SUV." According to the existing prior art, in which all output variable values, in principle, were considered in the backpropagation, it was no longer possible to use the old learning images only labeled with the classes "passenger car," "truck" or "delivery vehicles" during training that should also make recognition of SUVs possible. It was only possible to use learning images for which the "SUV" class was also available for selection when said learning images were labeled.

Because a subset of the output variable values is now excluded from consideration in the backpropagation, the ANN cannot distinguish during training whether a learning data set without the "SUV" class did not have this class from the outset or whether the learning data set was labeled with the "SUV" class, but this class was excluded from the backpropagation. Thus, old learning data sets, for which the "SUV" class was not available for selection when said old learning data sets were labeled, can be mixed with new learning data sets, for which this class was available for selection when said new learning data sets were labeled, and they can be used together for training.

In a further advantageous embodiment, output variable values that are excluded from consideration in the backpropagation are also excluded from the evaluation by the cost function. In this way, the computing effort for a portion of the error that is not backpropagated anyway can be saved.

Alternatively, the contributions of different output variable values to the error can be used in order to determine only those output variable values that are to be included in the backpropagation or excluded from the backpropagation. In a further advantageous embodiment, output variable values are ordered according to their deviations from the respective learning output variable values. Only a defined portion of the output variable values having the greatest deviations is included in the backpropagation.

Similarly, output variable values can be ordered according to their uncertainties, which uncertainties are measured with any metric. Only a defined portion of the output variable values having the greatest uncertainties is then included in the backpropagation. The uncertainty can be, for example, epistemic uncertainty.

The selection of the output variable values to be included in the backpropagation according to deviations or uncertainties focuses the training of the ANN in a targeted manner on situations that it has not yet mastered as well as other situations. This increases efficiency, analogous to flashcard decks with several subjects that stimulate frequent repetition of vocabulary that is often not known and present vocabulary that is already well-anchored in long-term memory only very sporadically for revision.

In a further particularly advantageous embodiment, during training, neurons and/or other processing units of the ANN, and/or connections between such neurons and/or other processing units, are randomly temporarily deactivated in accordance with a predetermined distribution. This "drop-out" of neurons or other processing units cannot replace the exclusion of starting variable values from the backpropagation with regard to the effect of said exclusion, but can supplement said exclusion synergistically.

In a further advantageous embodiment, in the process of changing the parameters, the learning rate is reduced in proportion to the increase in the portion of output variable values excluded from the backpropagation. This increases the stability of the training and counteracts the tendency where training with an incompletely backpropagated error causes knowledge that is already acquired to be "forgotten."

As explained above, an important application of ANNs for object recognition is at least partially automated guidance of vehicles in traffic. Furthermore, this is also advantageous according the method described above for optical quality control of products manufactured in series on the basis of images of the manufactured products. Here too, it is shown that the ANN trained with only partial backpropagation is better generalized to unseen data. For example, if a learning image shows a product having two recognizable cases of damage and is semantically segmented by the ANN, excluding one of the cases of damage from the backpropagation can result in the learning image also contributing to the learning success of the ANN with respect to products having only one case of damage. By excluding one of the cases of damage from the backpropagation, it no longer affects a change in the parameters of the ANN.

The disclosure also relates to a further method that completes the chain of action up to the relevant technical system.

This method begins by training an ANN using the previously described method. The ANN is operated by supplying input variables thereto, which input variable values in turn comprise measurement data. The ANN maps the input variables onto output variables. A control signal is formed from the output variables. A vehicle, and/or a system for quality control of products manufactured in series is controlled using the control signal.

The methods can in particular be wholly or partially computer-implemented. For this reason, the disclosure also relates to a computer program comprising machine-readable instructions which, when executed on one or more computers, cause said computer(s) to carry out one of the methods described above. In this sense, control devices for vehicles and embedded systems for technical devices, which are also capable of executing machine-readable instructions, are to be regarded as computers.

The disclosure also relates to a machine-readable data carrier and/or to a download product comprising the computer program. A download product is a digital product that can be transmitted via a data network, i.e. downloadable by a user of the data network, and which can be supplied for immediate downloading in an on-line store for example.

Furthermore, a computer can be equipped with the computer program, with the machine-readable data carrier, or with the download product.

Further measures improving the disclosure are explained in more detail below, together with the description of the preferred embodiments of the disclosure, with reference to figures.

DETAILED DESCRIPTION

Figure 1:
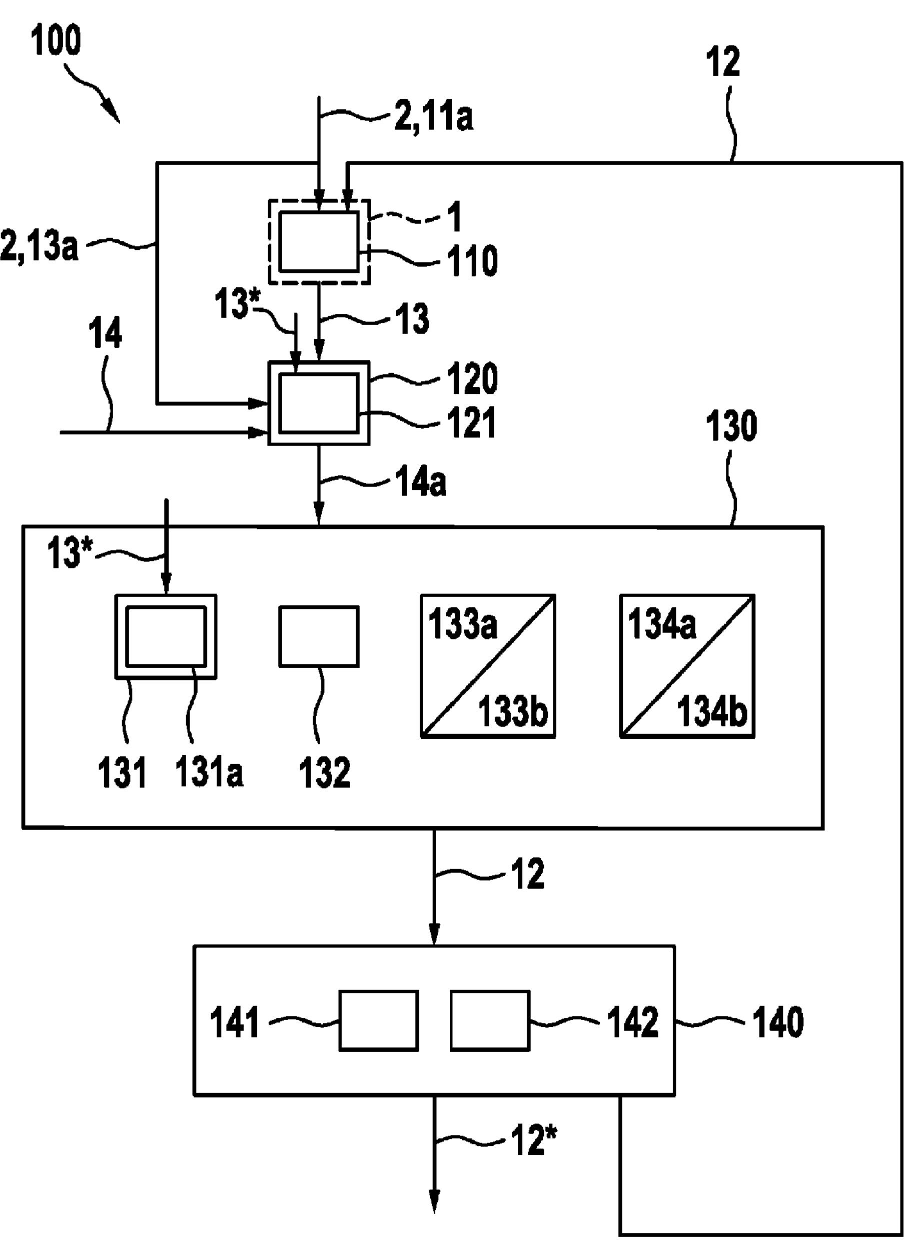
FIG. 1 shows an embodiment of the method 100 for training the ANN 1.

FIG. 1 is a schematic flow chart of an embodiment of the method 100 for training the ANN 1. In step 110, learning input variable values 11*a* from at least one learning data set 2 used for the training are mapped onto output variable values 13 by means of the ANN 1. The behavior of the ANN is characterized by parameters 12.

In step 120, these output variable values 13 are compared with the learning output variable values 13*a* from the associated learning data set 2. The result of this comparison is processed in accordance with a cost function 14 to form a measure of the error 14*a* of the ANN 1 during processing of the learning input variable values 11*a*.

Based this error 14*a*, changes in the parameters 12, the execution of which, when learning input variable values 11*a* are further processed by the ANN 1, is likely to improve the evaluation of the thus obtained output variable values 13 by the cost function 14, are determined in step 130 using backpropagation. In this case, according to block 131, a subset 13* of the output variable values 13 is excluded from consideration in the backpropagation.

In this case, according to block 131*a*, the frequency distribution of the output variable values 13 that are excluded from consideration in the backpropagation over the learning output variable values 13*a* that these output variable values 13 in each case aim for can in particular correspond to the frequency distribution of the different learning output variable values 13*a* in the learning data sets 2 used.

The output variable values 13* excluded from the backpropagation can optionally also already be excluded from the determination of the error 14*a*, according to block 121.

According to block 132, for at least one learning data set 2, a portion 13* of at least 40% and at most 60%, preferably of at least 45% and at most 55% and very particularly preferably of 50%, of the output variable values 13 generated from the learning input variable values 11*a* of said learning data set 2 can be excluded from consideration in the backpropagation.

According to block 133*a*, output variable values 13 can be ordered according to their deviations from the respective learning output variable values 13*a*. According to block 133*b*, only a defined portion of the output variable values 13 having the greatest deviations can then be included in the backpropagation.

According to block 134*a*, output variable values 13 can be ordered according to their uncertainties. According to block 134*b*, only a defined portion of the output variable values 13 having the greatest uncertainties can then be included in the backpropagation.

In step 140, the changed parameters 12 are applied to the ANN 1. Subsequently, learning input variable values 11*a* can be fed back to the ANN in step 110, such that a check can be carried out in a feedback loop to determine whether the success sought with the change to the parameters 12 has occurred with the error 14*a*. If any abort criterion is reached, the training can be ended and the state 12* of the parameters 12 that is then achieved can be output as the final state.

Optionally, according to block 141, during training, neurons and/or other processing units of the ANN 1, and/or connections between such neurons and/or other processing units, can be randomly temporarily deactivated in accordance with a predetermined distribution.

Optionally, according to block 142, in the process of changing the parameters 12, the learning rate can be reduced in proportion to the increase in the portion of output variable values excluded from the backpropagation.

Figure 2:
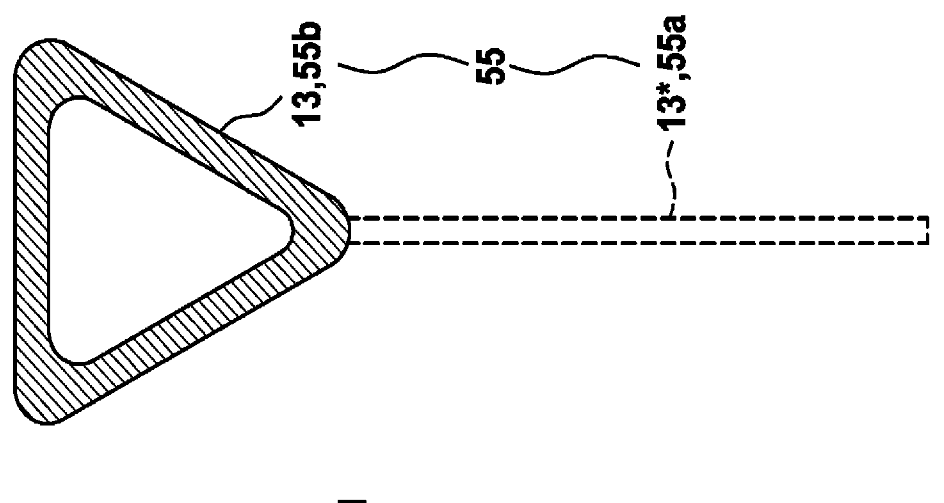
FIG. 2 shows examples of parts of a semantic segmentation that can be excluded from the backpropagation.
Figure 2:
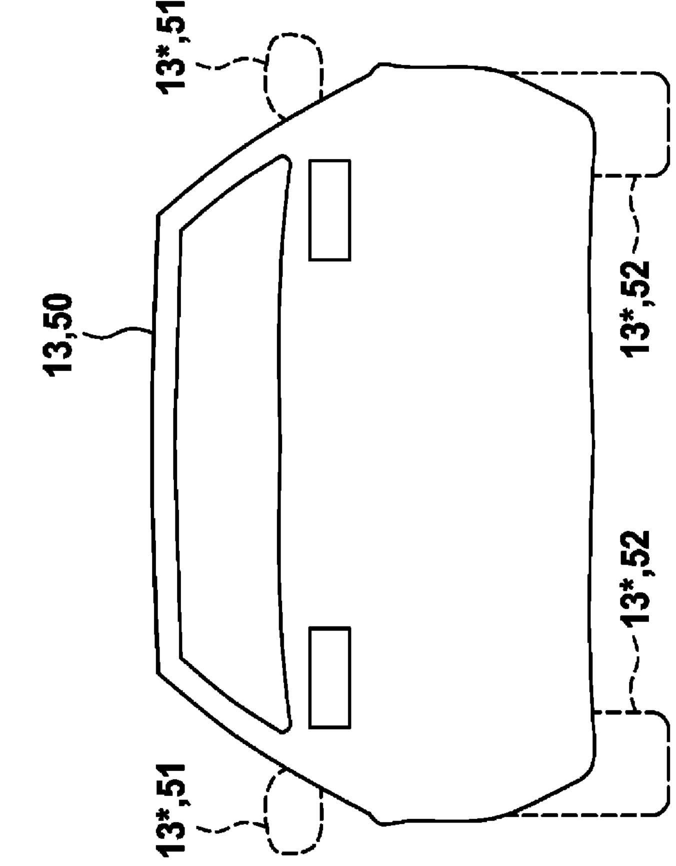

FIG. 2 shows an example of semantic segmentation of a learning image showing a traffic situation. In this traffic situation, a vehicle 50 waits at a "yield" sign 55. The semantic segmentation summarizes the output variable values 13 that the ANN 1 generated from the learning image.

The vehicle 50 has mirrors 51 and wheels 52. The mirrors 51 and wheels 52 can expediently be defined as the subset 13* of the output variable values 13 that is excluded from the backpropagation 130. As explained above, the mirrors 51 and the wheels 52 are more specifically dedicated to recognition of a particular vehicle type than generally for recognition of vehicles.

The road sign 55 has a pole 55*a* that carries a sign 55*b*. The pole 55*a* can in turn expediently be defined as the subset 13* of the output variable values 13 that is excluded from the back propagation 130.
All traffic signs have such a pole 55*a*, and it therefore does not contribute to the important recognition of precisely which traffic sign is present.

Figure 3:
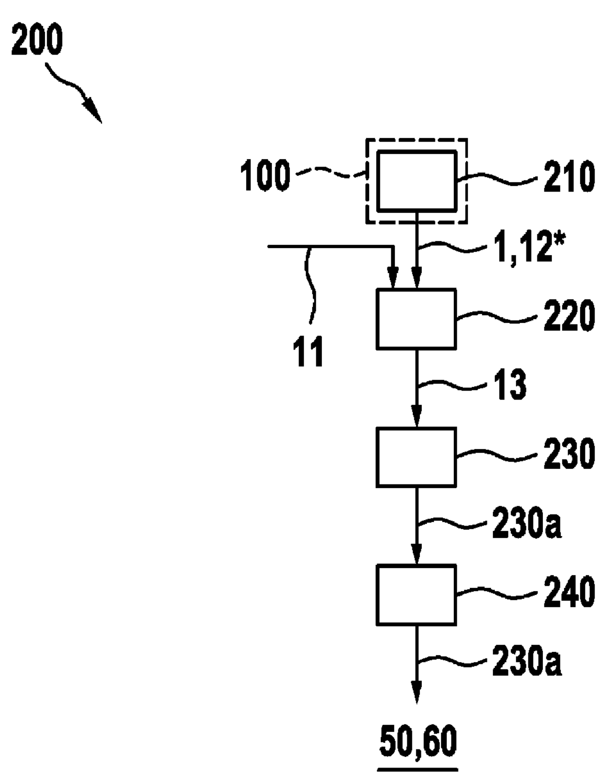
FIG. 3 shows an embodiment of the method 200 having a complete chain of action.

FIG. 3 is a schematic flow chart of an embodiment of the method 200 with the complete chain of action up to the control of technical systems 50, 60.

In step 210, an ANN 1 is trained using the previously described method 100. In step 220, the ANN 1 is operated by supplying input variables 11 thereto and mapping said input variables onto output variables 13. In step 230, a control signal 230*a* is formed from said output variables 13. In step 240, said control signal 230*a* is used to control a vehicle 50, and/or a system 60 for quality control of products manufactured in series.

The invention claimed is:

1. A method for training an artificial neural network (ANN) to receive images and at least one of detect objects in the images or semantically segment the images, behavior of the ANN being characterized by a plurality of parameters of the ANN, the method comprising:

receiving a plurality of learning data sets, each respective learning data set of the plurality of learning data sets including a respective learning image and respective learning output labels including at least one of respective object detection labels or respective semantic segmentation labels;

mapping, for each respective learning data set of the plurality of learning data sets, the respective learning image onto respective mapped output labels using the ANN;

determining, for each respective learning data set of the plurality of learning data sets, a respective error of the ANN by determining respective deviations of the respective mapped output labels from the respective learning output labels in accordance with a cost function; and iteratively refining the plurality of parameters of the ANN based on the respective errors of the ANN, by backpropagation, wherein a subset of the respective mapped output labels corresponding to each respective learning data set of the plurality of learning data sets is excluded from consideration in the backpropagation, and wherein the learning data sets are obtained using at least one of (i) a physical measuring operation, (ii) a partial or complete simulation of the physical measuring operation, or (iii) a partial or complete simulation of a technical system capable of being monitored by the physical measuring operation.

2. The method according to claim 1, wherein, for at least one learning data set of the plurality of learning data sets, a portion of at least 40% and at most 60 of the respective mapped output labels generated from the respective learning image of said learning data set is excluded from consideration in the backpropagation.

3. The method according to claim 1, wherein the respective learning images include pixel values assigned to pixels arranged in a two-dimensional grid.

4. The method according to claim 3, wherein:

the subset of the respective mapped output labels that are excluded from consideration in the backpropagation correspond to square blocks in the grid of pixels; and the respective mapped output labels each assign a semantic meaning to a respective one of the pixels of the respective learning image.

5. The method according to claim 4, wherein the square blocks have an edge length of between 16 and 256 pixels.

6. The method according to claim 1, wherein the respective mapped output labels are probabilities and/or confidences with which an ANN used as a classifier assigns the respective learning images to one or more classes of a predetermined classification.

7. The method according to claim 1, wherein a frequency distribution of the subset of the respective mapped output labels that are excluded from consideration in the backpropagation corresponds to a frequency distribution of the respective learning output labels in the learning data sets used.

8. The method according to claim 1, wherein output labels that are excluded from consideration in the backpropagation are also excluded from the determining of the error by the cost function.

9. The method according to claim 1, wherein:

the respective mapped output labels are ordered according to their deviations from the respective learning output labels; and only a fixed portion of the respective mapped output labels having the respective deviations that are greatest is included in the backpropagation.

10. The method according to claim 1, wherein:

the respective mapped output labels are ordered according to their uncertainties; and only a fixed portion of the respective mapped output labels having greatest uncertainties is included in the backpropagation.

11. The method according to claim 1, wherein, during training, neurons and/or other processing units of the ANN, and/or connections between such neurons and/or other processing units, are randomly temporarily deactivated in accordance with a predetermined distribution.

12. The method according to claim 1, wherein, in the iteratively refining the plurality of parameters, learning rate is reduced in proportion to an increase in a portion of the respective mapped output labels excluded from the backpropagation.

13. A method for operating at least one of a vehicle and a system for quality control of products manufactured in series, the method comprising:

training the artificial neural network (ANN), using the method according to claim 1;

operating the ANN by supplying new images thereto and mapping the new images onto mapped output labels;

forming a control signal from the mapped output labels provided by the ANN; and controlling the at least one of the vehicle and the system using the control signal.

14. The method according to claim 1, wherein, for at least one learning data set of the plurality of learning data sets, a portion of at least 45% and at most 55%, of the respective mapped output labels generated from the respective learning image of said learning data set is excluded from consideration in the backpropagation.

15. A non-transitory computer-readable storage medium that stores a computer program having instructions that, when executed on at least one computer, cause the at least one computer to carry out the method according to claim 1.

16. A computer equipped with the non-transitory computer-readable storage medium according to claim 15.

* * * * *